(12) United States Patent
Jäger et al.

(10) Patent No.: US 6,619,633 B2
(45) Date of Patent: Sep. 16, 2003

(54) APPARATUS FOR AERATING WATER

(75) Inventors: Andreas Jäger, Hannover (DE); Volker Edel, Isernhagen (DE)

(73) Assignee: Gummi-Jäger KG GmbH & Cie. (DE)

( * ) Notice: Subject to any disclaimer, the term of this patent is extended or adjusted under 35 U.S.C. 154(b) by 39 days.

(21) Appl. No.: 10/038,109

(22) Filed: Nov. 9, 2001

(65) Prior Publication Data

US 2002/0109247 A1 Aug. 15, 2002

(30) Foreign Application Priority Data

Nov. 10, 2000 (DE) .......................... 100 55 785

(51) Int. Cl.$^7$ .................................. B01F 3/04
(52) U.S. Cl. ..................... 261/122.2; 261/124
(58) Field of Search .................. 261/122.1, 122.2, 261/124, DIG. 70; 210/220, 221.2

(56) References Cited

U.S. PATENT DOCUMENTS

| | | | |
|---|---|---|---|
| 3,063,689 A | * | 11/1962 | Coppock |
| 3,432,154 A | * | 3/1969 | Danjes |
| 3,642,260 A | * | 2/1972 | Danjes et al. |
| 3,664,647 A | * | 5/1972 | Snow |
| 4,060,486 A | * | 11/1977 | Schreiber |
| 4,606,867 A | * | 8/1986 | Eguchi |
| 4,902,418 A | * | 2/1990 | Ziegler |
| 5,858,283 A | * | 1/1999 | Burris ............ 261/122.1 |
| 5,868,972 A | * | 2/1999 | Galich et al. ........ 261/122.1 |

* cited by examiner

Primary Examiner—C. Scott Bushey
(74) Attorney, Agent, or Firm—R W Becker & Associates; R W Becker

(57) ABSTRACT

An apparatus for aerating water is provided, and includes a support body and disposed thereon a slitted sleeve of rubber or similar elastomeric material. The support body has sides of greatly different lengths, with the longer sides being essentially vertical. The support body is preferably a board-like, flat, rectangular upright support body.

13 Claims, 2 Drawing Sheets

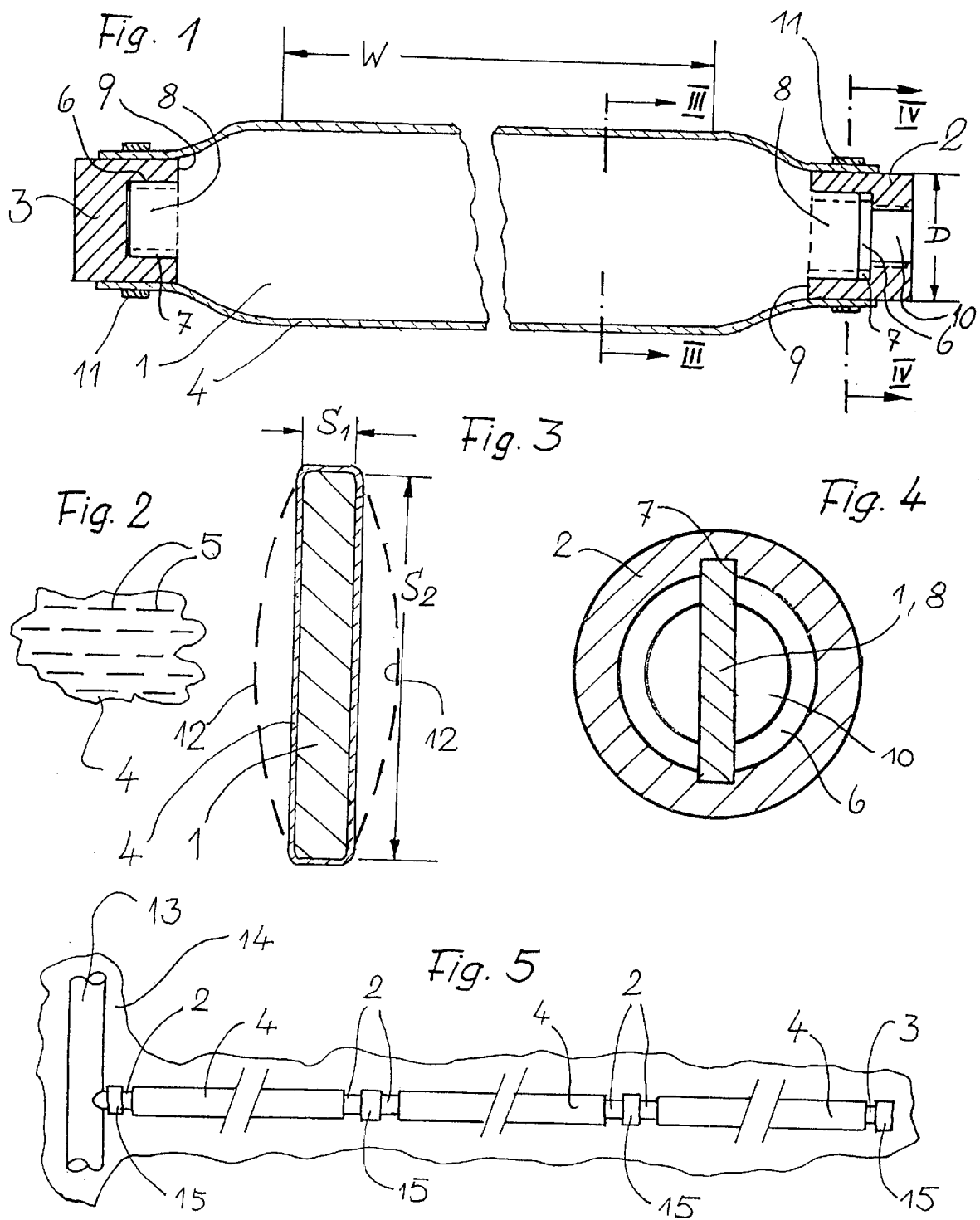

APPARATUS FOR AERATING WATER

BACKGROUND OF THE INVENTION

The present invention relates to an elongated apparatus for aerating water with fine and large bubbles. The apparatus has a support body, that extends essentially over the length of the apparatus, for a hose-like sleeve that tightly surrounds the support body and is made of rubber, or rubber-like materials. The sleeve is provided with a large number of slits that are distributed over the periphery of the sleeve and that open under the effect of compressed air.

With the heretofore known apparatus of this type, the support body is a tube, the hollow space of which can be flooded to avoid an undesirable buoyancy. When such an apparatus is supplied with compressed air, there is formed between the support body and the sleeve a region that is filled with the compressed air and that has a circular cross-sectional configuration that on the whole has a relatively great frictional resistance for the air and hence results in a correspondingly great loss of pressure. In addition, these known apparatus have the danger that the air bubbles that are discharged from the lower slits combine to form large bubbles. This adversely affects the aeration.

It is therefore an object of the present invention to eliminate these drawbacks, or at least to considerably reduce the effect thereof.

BRIEF DESCRIPTION OF THE DRAWINGS

This object, and other objects and advantages of the present invention, will appear more clearly from the following specification in conjunction with the accompanying schematic drawings, in which:

FIG. 1 is a longitudinal cross-sectional view of one exemplary embodiment of an inventive elongated apparatus for aerating waste water or the like;

FIG. 2 is a partial plan view of the slitted sleeve for the apparatus of FIG. 1;

FIG. 3 is a cross-sectional view taken along the line III—III in FIG. 1;

FIG. 4 is an cross-sectional view taken along the line IV—IV in FIG. 1, but without the sleeve and the clamp disposed thereon;

FIG. 5 is a partial plan view of an aerating arrangement mounted on the base of a water reservoir or tank, using the apparatus of FIG. 1;

SUMMARY OF THE INVENTION

Figure 6:
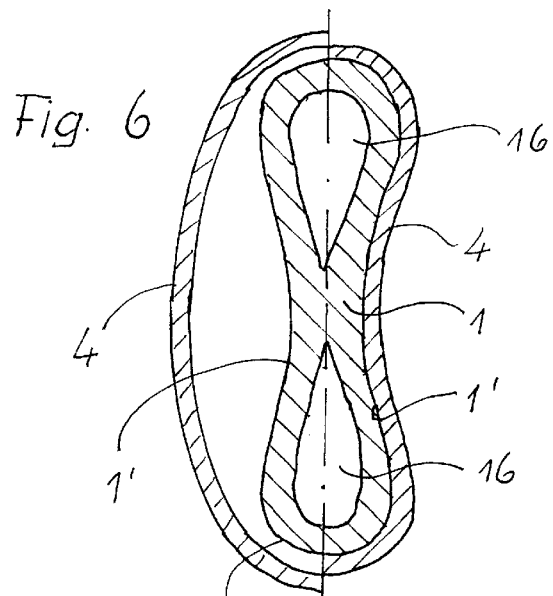
FIG. 6 is a view similar to that of FIG. 3 of a modified support body, whereby the left half shows the operating state and right half shows a state of rest.

The apparatus of the present invention is characterized primarily by a support body having sides of greatly different lengths, with at least essentially vertically disposed longer sides, whereby the support body expediently has an at least essentially flat, rectangular, board-like cross-sectional configuration, the longer sides of which, within the context of the present invention, are disposed at least practically vertically. In this connection, the ratio of the lengths of the sides are approximately 1:3 to 1:15, preferably 1:10.

A support body embodied in this fashion, with a sleeve that rests tightly there against without folds or creases, prevents flexing or bending from buoyancy due to its cross-sectional configuration. It is therefore possible to have apparatus that are more than four meters long. In addition, when the sleeve bulges as a result of being supplied with compressed air, no hollow spaces are formed on both sides of the support body that have a circular cross-section; rather, the hollow spaces have an essentially circular segment-like section. As a result, the frictional resistance is reduced for the air that is flowing through. Furthermore, in an operating condition of the sleeve an approximately oval sleeve cross-section is formed that in the lower portion extensively prevents a combination of small bubbles to form large bubbles.

The inventive apparatus also provides the possibility of being able to carry out an aeration with large bubbles. In particular, large quantities of air can be transported without significant pressure losses. Tests have shown that very flat pressure loss characteristic curves result for volume flows of about 2–30 $m^3/h$ (and per meter of apparatus length).

The fittings that are required for closing off the apparatus can have any desired configuration. However, the support body is advantageously connected to the fittings via a preferably releaseable plug connection, and the fittings in turn can also be provided with peripheral or circumferential grooves for receiving the hose clamps with which the sleeve is securely clamped to the outside of the fittings.

It should be noted that the present invention is not limited to geometrically precisely rectangular shapes of the support body. For example, the edges or corners can also be chamfered or significantly rounded, or the side surfaces can be slightly curved or bulged.

Further specific features of the present invention will be described in detail subsequently.

DESCRIPTION OF PREFERRED EMBODIMENTS

Referring now to the drawings in detail, the apparatus essentially comprises a board-like, rigid support body 1 that is made, for example, of a hard polymeric material; the apparatus also comprises two fittings, 2, 3 disposed at the ends of the apparatus, and a hose-like sleeve or casing 4 that is free of folds or creases, is made of rubber or similar elastomeric material, and when not supplied with air tightly surrounds the support body 1. The inner diameter of the sleeve 4 practically corresponds to the outer diameter D of the fittings 2, 3, i.e. twice the sum of the side lengths $S_1+S_2$.

Over the greatest portion of the length of the apparatus, the working length W in the region of the side length $S_2$ of the support body 1, the sleeve 4 is provided with a plurality of small slits 5 that, when compressed air is introduced between the support body 1 and the sleeve 4, open and deliver small bubbles into the water; the slits 5 close again when the internal pressure is reduced or eliminated.

Those sides of the two fittings 2, 3 that face the support body 1 are provided with round recesses 6 that at diametrically opposed locations are provided with longitudinal slots 7. Tab or tang-like extensions 8 on the ends of the support body 1 releaseably engage in the recesses 6. To prevent rotation, the edges of the extensions 8 are disposed in the longitudinal slots 7. The inwardly disposed ends of the fittings 2, 3 rest securely against an end face 9 of the support body 1; the end faces 9 are formed by a stepped configuration of the support body 1. In other respects, the outer diameter D of the fittings 2, 3 of FIG. 1 merge gradually into the side length dimension $S_2$.

While the fitting 3 forms an airtight end, the fitting 2 is provided with a threaded bore 10 in order at that location to be able to connect air supply conduits or the like.

The ends of the sleeve 4 are clamped securely onto the fittings 2, 3 by clamping collars 11 or the like. For securement, the fittings can be provided on their outer surfaces with circumferential grooves into which the sleeve 4, under the effect of the clamping collars 11, can be drawn in order in this way to also establish a pull-resist connection between the fittings 2, 3 and the sleeve 4, and to secure the plug connection between the fittings 2, 3 and the support body 1.

As can be seen from FIG. 3, the support body 1 is disposed upright (the longer side having the length $S_2$ is at least approximately vertical). Consequently, there results in relation to the vertical a rigid support that prevents bending or flexure due to the buoyancy in the water. In addition, during the introduction of compressed air via the bore 10, relatively large volume, approximately circular segment shaped pressure chambers form on both sides of the support body 1 and reduce the frictional or pressure loss. The bulges that form are indicated by the dashed lines 12. The air bubbles that are discharged in the lower portion of the cross-section, i.e. at the lower edge of the support body 1, for all practical purposes cannot combine to form larger bubbles.

The resistance of the apparatus to bending also makes it possible to dispose a plurality of apparatus in a row to form strands of considerable length, as can be seen from FIG. 5. Thus, the strands can be supplied, for example, from one end by a common main or line 13. An anchoring on the base 14 of the water reservoir or tank can be effected by mounting brackets 15 that engage the fittings 2 or the end fitting 3, in which connection it is to be understood that the fittings 2 that are provided with the bores 10 are interconnected by appropriate tubular pieces or connectors, or are connected to the common main 13.

Also with the cross-sectional configuration shown in FIG. 6 is a slender, upright body used for the support body 1, although it is provided on both sides with slightly concave side surfaces 1', and at the upper and lower ends with rounded portions 1". The two hollow spaces 16 are preferably flooded in order to prevent unnecessary buoyancy. This cross-sectional configuration has the advantage of an increased mechanical transverse rigidity and good characteristics with regard to reduction of the resistance to air flow. In this connection, the entire periphery of the sleeve 4, but possibly also only in the region of the side surfaces 1', can be provided with slits. The concave shape could, if desired, also be provided on only one side.

Figure 7:
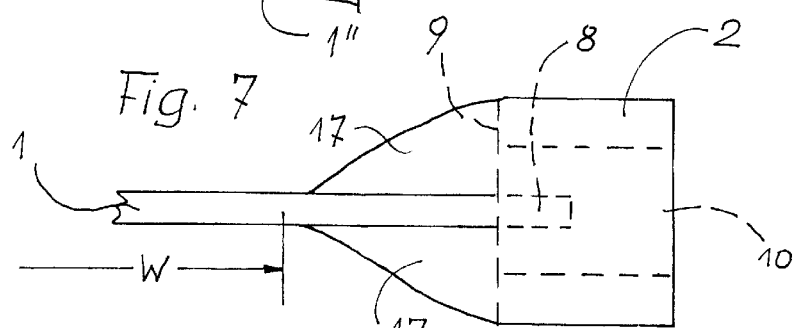
FIG. 7 is a plan view of the end portion of a support body having a fitting.
Figure 8:
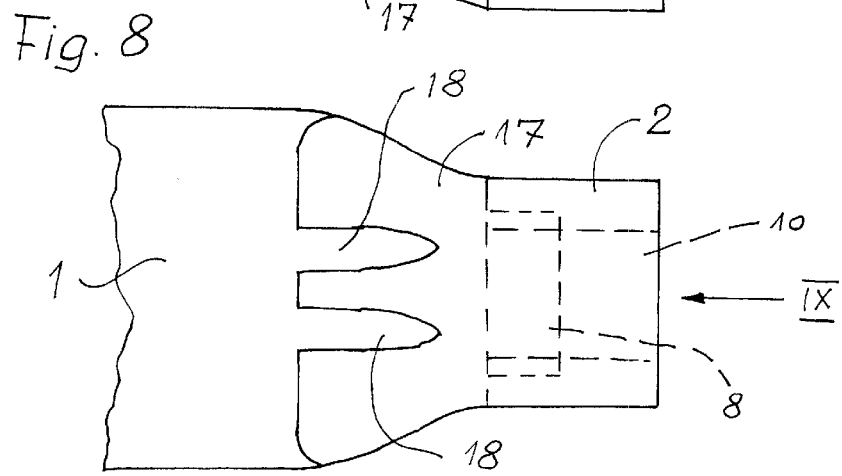
FIG. 8 is a side view of FIG. 7.
Figure 9:
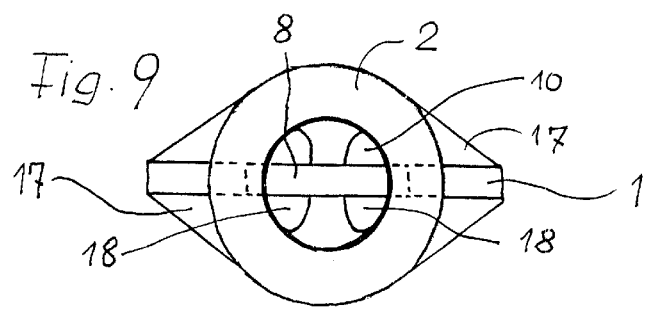
FIG. 9 is a view taken in the direction of the arrow IX in FIG. 8.

Due to the different cross-sectional shapes of the fittings 2, 3 on the one hand, and the support body 1 on the other hand, it is advantageous to eliminate the stepped configuration that results by means of a specially shaped carrier element 17 for the sleeve 4 in order to preclude unacceptable stretching of the sleeve 4 (not illustrated in FIGS. 7–9). These carrier elements 17, which can be a fixed component of the fittings 2, 3 or could also be detachably connected therewith, merge practically in a smooth or continuous manner from the cylindrical surface of the fittings 2, 3 into the side surfaces of the support body 1. That portion of the carrier element 17 that faces the support body 1 is additionally provided with two recessed areas 18 in order to ensure a supply of air below the sleeve 4 via the bore 10. If the carrier 17 is securely connected to the fittings 2, 3, the ends of the support body 1 can be readily inserted into the fittings and if desired secured therein.

The specification incorporates by reference the disclosure of German priority document DE 100 55 785.6 of Nov. 10, 2000.

The present invention is, of course, in no way restricted to the specific disclosure of the specification and drawings, but also encompasses any modifications within the scope of the appended claims.

What we claim is:

1. An elongated apparatus for aerating water with bubbles, comprising:

a support body that essentially extends over a length of the apparatus, wherein said support body has, when viewed in section, sides of greatly different lengths relative to one another, and wherein the longer ($S_2$) of these sides is adapted to be disposed essentially vertically;

a hose-like sleeve of elastomeric material, wherein when not supplied with air said sleeve tightly surrounds said support body, and wherein said sleeve is provided with a large number of slits that are distributed over a periphery of said sleeve and open under the effect of compressed air; and respective fittings disposed at ends of the apparatus, wherein said sleeve is secured to said fittings.

2. An apparatus according to claim 1, wherein said support body has an at least approximately flat, rectangular cross-sectional configuration.

3. An apparatus according to claim 2, wherein the lengths of said sides have a ratio of about 1:3 to 1:15.

4. An apparatus according to claim 3, wherein the lengths of said sides have a ratio of about 1:10.

5. An apparatus according to claim 1, wherein a detachable plug connection is provided between ends of said support body and said fittings disposed at ends of the apparatus.

6. An apparatus according to claim 5, wherein ends of said support body are provided with a respective extension for being received in a recess of said fittings.

7. An apparatus according to claim 6, wherein said extensions of said support body are prevented from rotating by engaging in a slot of said fittings.

8. An apparatus according to claim 5, wherein said plug connection is secured from detachment by a clamping of ends of said sleeve on said fittings that are disposed at ends of the apparatus.

9. An apparatus according to claim 1, wherein at least two of such apparatus are combined to form a strand, and wherein mounting brackets for said strand engage said fittings disposed at ends of the apparatus.

10. An apparatus according to claim 1, wherein a periphery of said fittings disposed at ends of the apparatus, and a sum of all of said lengths of said sides of said support body, correspond with one another.

11. An apparatus according to claim 1, wherein at least one side surface of said support body has a slightly concave configuration.

12. An apparatus according to claim 11, wherein said support body has hollow spaces that can be flooded.

13. An apparatus according to claim 1, wherein a fixed or rigid carrier element is provided between said fittings and said support body, wherein said carrier element serves for supporting said sleeve and merges practically continuously from a peripheral surface of said fittings into side surfaces of said support body, and wherein said carrier element is provided with at least one opening for the supply of air.

\* \* \* \* \*